Sept. 25, 1951 W. P. SPIGENER 2,569,352
STIRRING APPARATUS FOR GLASS IN FOREHEARTHS
Filed July 29, 1949 2 Sheets-Sheet 1
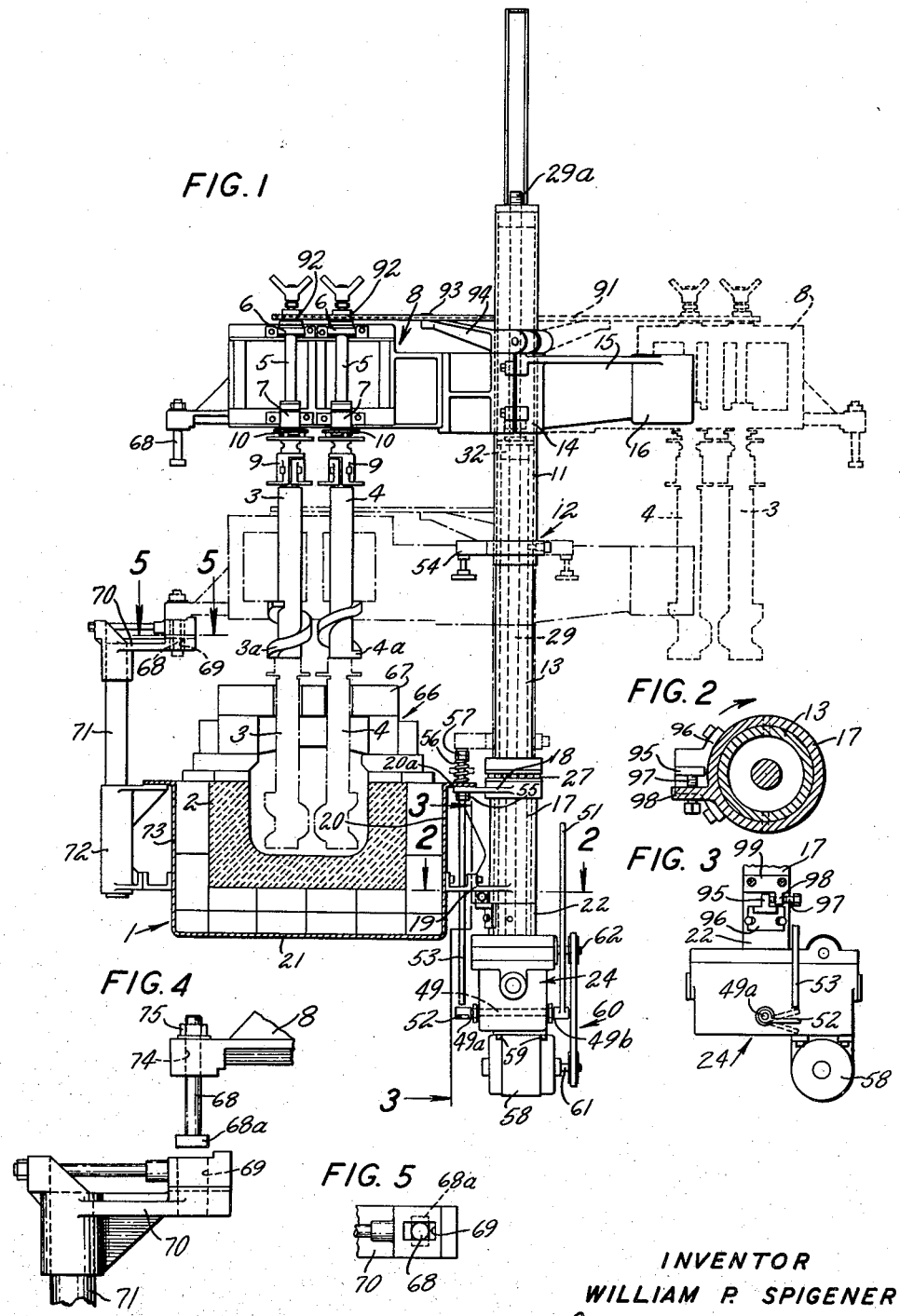
INVENTOR
WILLIAM P. SPIGENER
BY Parham & Bates
ATTORNEYS

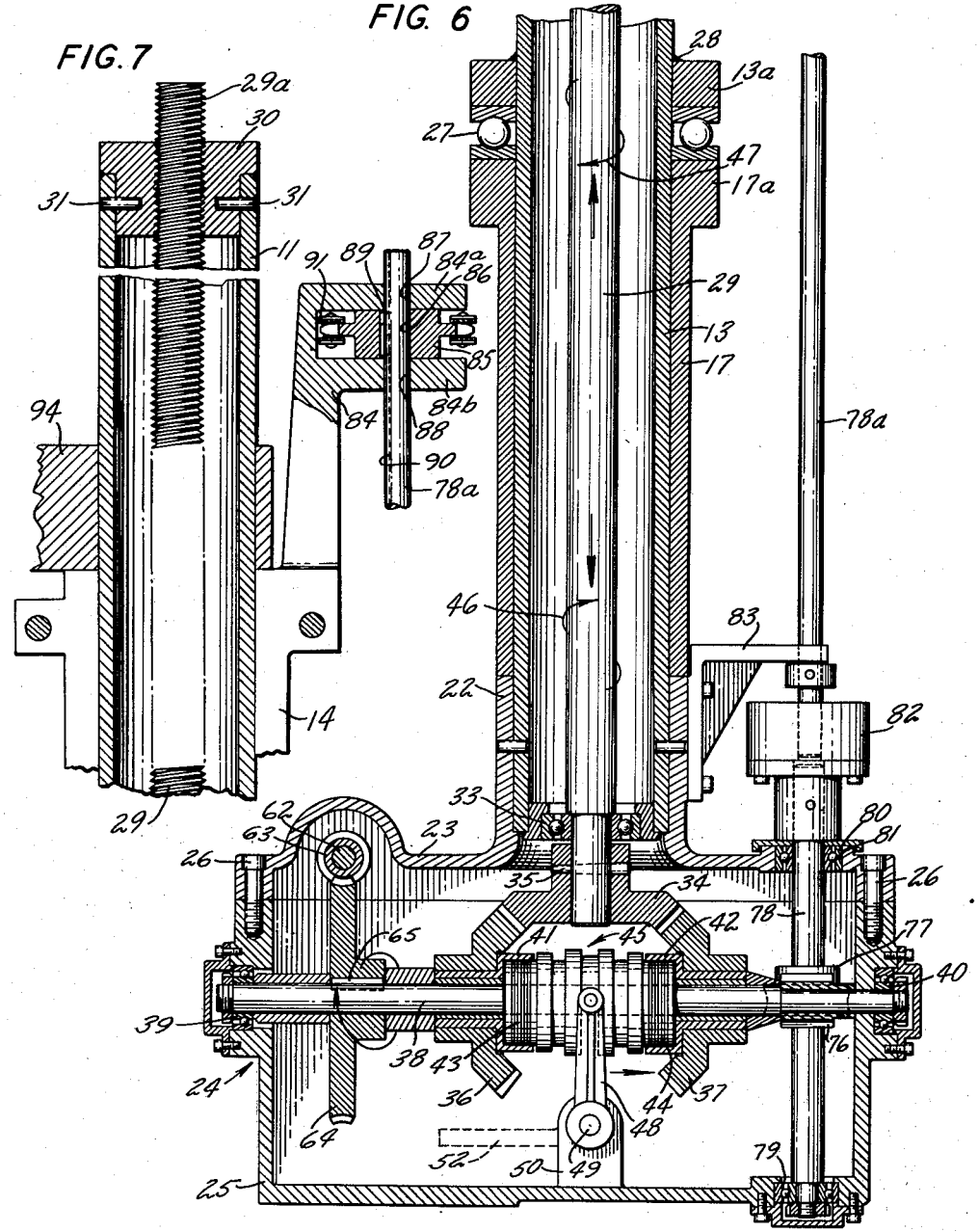

Patented Sept. 25, 1951

2,569,352

UNITED STATES PATENT OFFICE 2,569,352

STIRRING APPARATUS FOR GLASS IN FOREHEARTHS

William P. Spigener, Elmwood, Conn., assignor to Emhart Manufacturing Company, a corporation of Delaware Application July 29, 1949, Serial No. 107,574

8 Claims. (Cl. 259—104)

This invention relates to improvements in means for operatively supporting and rotating a vertical stirrer or stirrers for molten glass in a forehearth as, for example, in the manner and for the purposes disclosed in U. S. Patent No. 2,467,809 of April 19, 1949.

An object of the invention is to provide stirrer supporting and operating means constructed and arranged so that the stirrer or stirrers supported thereby can be raised vertically out of the forehearth and thereafter swung at the elevated level to one side of the forehearth where such stirrer or stirrers can be examined safely and easily by a workman standing on a customary catwalk at the side of the forehearth and returned to service without being detached or handled if in good condition or conveniently and quickly removed and replaced if the occasion requires.

Novel means for supporting and operating a stirrer or stirrers in accordance with the present invention greatly facilitates change of stirrers, and reduces the time required therefor, reduces personal hazard to a workman or workmen employed to do this, and permits examination and return to service of stirrers while still operatively supported and connected to the stirrer operating means without handling if they are in good condition. Such means also permits a stirrer or stirrers which have been raised from the glass in a forehearth channel to be positioned thereabove so that any glass adhering thereto may drain back into the glass in the forehearth before lateral swinging movement of such stirrer or stirrers, thereby obviating smearing of glass on the forehearth roof structure. Supporting means of the invention also allows the operatively supported returned or replacement stirrer or stirrers to be lowered slowly into the molten glass in the forehearth channel so as to avoid breakage due to heat shock.

Other objects and advantages of the invention hereinafter will be pointed out or will become apparent from the following description of a practical embodiment thereof as illustrated in the accompanying drawings, in which:

Fig. 1 is a transverse section through a forehearth equipped with a pair of vertical stirrers supported and operated by means of the present invention, the stirrers and the operating and supporting means therefor being shown in full lines in the positions they occupy when the stirrers have been raised vertically out of the forehearth, the view also showing by dot-and-dash lines the positions of the stirrers and their overhanging supporting arm when the stirrers are operatively disposed in the forehearth and by dotted lines the positions of these same parts when the elevated stirrers have been swung laterally to one side of the forehearth;

Fig. 2 is a relatively enlarged section along the line 2—2 of Fig. 1;

Fig. 3 is a fragmentary elevation of a lower portion of the supporting and operating means as viewed from the line 3—3, looking in the direction of the arrows;

Fig. 4 is a fragmentary view of cooperative elements of a latching and supporting device for the free end of the overhanging stirrer arm, the view showing these elements separated as they appear when the arm has been raised slightly from position to position the stirrers operatively in the forehearth;

Fig. 5 is a fragmentary plan view of the cooperative latching elements of Fig. 4 in engaged positions as viewed from the line 5—5 of Fig. 1;

Fig. 6 is a relatively enlarged vertical sectional view through a clutch and gear box and a fragmentary lower portion of the supporting post or column for the overhanging stirrer supporting arm, together with fragmentary portions of the vertical shafts for elevating the stirrer supporting arm and rotating the stirrers, respectively; and Fig. 7 is a similarly enlarged fragmentary vertical sectional view of the upper portion of the supporting post or column and adjacent parts, the view also showing the upper portions of the elevating and stirrer rotating shafts.

In Fig. 1, a forehearth, generally designated 1, includes a channel 2 which, in use, contains a stream of molten glass, not shown. Vertical stirring implements 3 and 4 have screw threaded lower glass stirring portions 3a and 4a, respectively, which are immersed in the glass in the forehearth channel when the stirrers are operatively positioned therein as indicated by the dot-and-dash lines. In such operative positions, the stirring implements are spaced transversely of the forehearth channel and depend from vertical spindles 5 which are rotatably supported by suitable vertically spaced upper and lower bearings 6 and 7, respectively, on a horizontally disposed carrying arm generally designated 8.

The connection of the stirrers 3 and 4 with their spindles may comprise chucks 9 detachably connected by couplings 10 to the lower ends of the spindles 5. The particular means for detachably connecting the stirring implements with the vertical spindles, and for rotatably mounting the spindles on the supporting arm 8 do not, per se, form part of the present invention and any suitable means may be employed.

The supporting arm 8 is mounted at one end on an upper tubular section 11 of a vertical tubular post or column, generally designated 12, which includes also a lower tubular section 13 which is supported on a side of the forehearth as presently will be pointed out and with which the tubular upper section 11 is telescopically associated. As shown, the supporting arm 8 is firmly secured on upper tubular section 11 by a split collar 14. A rigid arm 15 extends from this split collar at the opposite side thereof from the arm 8 and carries a counterweight 16. The lower section 13 of the supporting post or column depends, as best seen in Fig. 6, through a fixed position tubular support 17 which is provided with vertically spaced bracket arms 18 and 19, respectively, Fig. 1, attached to the adjacent side 20 of the forehearth channel casing 21. Obviously, the support 17 may be secured in a fixed position relative to the forehearth in any suitable way.

Below the stationary support 17, the lower end of the lower section 13 of the tubular supporting column 12 fits in and is firmly secured to an upturned tubular boss 22 on the top or cover section 23 of a clutch and gear box, generally designated 24. The box 24 includes a main or body section 25 on which the cover section 23 is secured, as by cap screws 26. See Fig. 6. The support of the lower section 13 of the tubular column on the fixed position tubular support 17 is by an antifriction thrust bearing 27, Fig. 6, which is operatively disposed between the flanged upper end portion 17a of the support 17 and a flange 13a which is secured on the tubular section 13, as by welding as indicated at 28, or in any other suitable known way. With the construction just described, the section 13 of the tubular supporting post or column is mounted to turn about its vertical axis and supports the gear and clutch box 24 to turn therewith.

The upper section 11 of the tubular supporting post or column is movable vertically in relation to the lower section 13 with which it is telescopically associated by the co-action of the threaded upper end portion 29a of a jack shaft 29 with a nut 30 which is secured, as by the pins 31, Fig. 7, in the upper end portion of the section 11. The vertical jack shaft 29 extends through the upright tubular post or column 12 from the upper part of the gear and clutch box 24, being rotatably mounted therein and held against any appreciable axial movement by opposed upper and lower thrust bearings 32 and 33, respectively, in the upper and lower ends of the lower tubular section 13, the upper thrust bearing 32 being shown in Fig. 1 and the lower thrust bearing 33 being shown in Fig. 6. For turning the jack screw 29 to raise or lower the upper section 11 of the supporting post to raise or lower the stirrer arm 8 and the stirrers depending therefrom, a suitable reversible drive mechanism is provided and an example thereof will now be described.

As shown in Fig. 6, a bevel gear 34 is secured, as by a pin 35, to the lower end portion of the jack screw 29 within the upper part of the gear and clutch box 24. The gear 34 is in mesh with opposed bevel gears 36 and 37, respectively, which are loose on a horizontally disposed driven shaft 38 which is operatively supported in the box 24, as by having its opposite end portions mounted in antifriction bearings 39 and 40, respectively, in suitably apertured opposite end wall portions of the body section 25 of the box 24. The gears 36 and 37 carry driven clutch cup members 41 and 42, respectively, for cooperating with clutch disc assemblies 43 and 44, respectively, at the opposite ends of a conventional double throw double friction clutch mechanism, generally indicated at 45. Any other suitably known clutch construction may be used. When the clutch 45 is shifted to the right as viewed in Fig. 6, the driven clutch cup 42 will be engaged and the gear 37 will be driven with the shaft 38, thereby turning the jack screw 29 in one direction about its axis. With the shaft 38 rotating in the direction indicated by the direction arrow in Fig. 6, the direction of turning of the jack screw 29 about its axis when the gear 37 is driven will be counterclockwise as indicated by the direction arrow 46. This will lower the upper section of the tubular column and the supporting arm 8 thereon. When the clutch 45 has been actuated to engage the driven clutch member 43 on the bevel gear 36, the direction of rotation of the jack screw 29 will be reversed and then will be as indicated by the direction arrow 47. This is the direction of rotation of the jack screw to elevate the upper section 11 of the tubular post and the supporting stirrer arm 8 to the positions shown by full lines in Fig. 1. A conventional clutch shifter fork 48 may be employed to shift the clutch 45 from its intermediate, neutral position as shown in Fig. 6 either to the right to effect downward movement of the stirrer arm 8 or to the left to effect raising of that arm.

The clutch shifting fork 48 is carried by a horizontal rock shaft 49 which is suitably supported as by means such as indicated at 50 on the bottom of the box 24, the opposite ends of such shaft projecting from opposite sides of the box 24 as indicated at 49a and 49b, respectively. One of these ends may be provided with a manually operable hand lever 51, Fig. 1. The opposite end is provided with a laterally extending rigid rocker arm 52. When the clutch 45 is in its intermediate, neutral position, this rocker arm 52 may be horizontal as shown by full lines in Fig. 3. When the clutch is shifted to the right as viewed in Fig. 6, the lateral rocker arm 52 will be raised to the position indicated by the dotted lines in Fig. 3 against the lower end of a normally raised, spring loaded, vertically movable clutch throwout rod 53 which is located below and in the path of downward movement of a suitably located striker 54 on the upper section 11 of the telescopic supporting post 12. When the section 12 is lowered by the jack screw to lower the stirrers into the forehearth, the striker 54 will push the rod 53 downward against the rocker arm 52 so as to return the clutch 45 to its intermediate, neutral position when the stirrers have been lowered until their lower ends are at the desired level above the bottom of the forehearth channel. This is a safety device to prevent the lower ends of the stirrers striking the bottom of the forehearth channel. The rod 53 is vertically guided in any suitable manner, as by extending slidably through suitable apertures in the bracket arms 18 and 19 and through a flange 20a on the side 20 of the forehearth channel casing. Stop means, as the nuts 55, may be provided on the rod 53 beneath the bracket arm 18 for co-acting with a coil spring 56 on the rod above the flange 20a and beneath nuts 57 on the upper end of the rod so as to maintain the rod yieldingly in its raised position while permitting downward axial movement thereof under the impact of the striker 54 to effect timely disengagement of the clutch from the jack screw driving gear 37.

The shaft 38 is driven from a suitable prime mover, which may be a conventional motor and speed reduction unit shown diagrammatically at 58 in Fig. 1. This driving unit is suspended, as at 59, from the bottom of the gear and clutch box 24 so as to turn with the latter. Motion transmission means, shown as a belt, and suitable pulleys generally indicated at 60, operatively connect the drive shaft 61 of the unit 58 with a short countershaft 62 which extends transversely across the upper part of the interior of the box 24, being suitably rotatably supported in the desired position therein. The shaft 62 carries a worm 63, Fig. 6, in mesh with a worm gear 64 which is keyed at 65 to the shaft 38.

The provisions just described afford facilities for raising and lowering the arm 8 to dispose it in an elevated position above the forehearth channel, as shown in full lines in Fig. 1, or in its service position, as shown by the dot-and-dash lines in the same view. The forehearth 1 comprises a cover structure 66 including individually movable roof blocks represented by that shown at 67 in Fig. 1 which normally surround the shanks of the stirrers and may be moved apart to permit raising of the stirrers from their service positions to their elevated positions without striking any of these blocks and to afford space for drainage of glass from the elevated stirrers down into the forehearth channel without smearing the roof blocks.

When the arm 8 is in its lowered, service position, at which it extends transversely across the forehearth channel, a depending latching element 68 on the extremity of that arm depends through a vertical aperture 69 in a stationary latching arm 70 on a post 71 which is carried by a bracket 72 secured to a stationary support 73. This may be the side of the forehearth channel casing 21 opposite that which carries the supporting post 12. The latching element 68 is shown as a bolt having a non-circular head 68a at its lower end appropriately configured and of a suitable size to descend through a suitably configured and sized aperture 69 in the stationary latching arm 70 when the head 68a is turned so that its major transverse axis coincides with that of the aperture 69. The bolt 68 extends through a vertical opening 74 in the extremity of the arm 8 and is provided above the latter with adjustable stop means such as the nut indicated at 75. Thus, when the arm 8 is in its lowered service position and the bolt 68 depends through the aperture 69 in the fixed position latching arm 70, the head 68a may be turned transversely of the aperture 69 as shown in Fig. 5 and the nut 75 then may be tightened if required to assure firm latching of the arm 8 to the fixed position arm 70 and seating of the bottom part of the extremity of the arm 8 on the top of the extremity of the arm 70 as shown in Fig. 1. To release the arm 8, it then is only necessary to loosen the nut 75 if required and to turn the head 68a so that it will be moved upward through the correspondingly shaped aperture 69 simply by raising the arm 8.

As the stirring implements 3 and 4 and the arm 8 are raised from their dot-and-dash line positions to the full line positions shown in Fig. 1, glass adhering to these stirring implements may drain back into the forehearth channel. When this has been completed, the arm 8, its supporting column 12, the gear and clutch box 24 and driving unit 58 depending therefrom may be turned as a unit about the axis of the column 12 to position the elevated arm 8 and depending stirrers in their laterally swung positions as shown by dotted lines in Fig. 1. The stirrers then may be examined quickly and safely by a workman standing on a catwalk (not shown) adjacent to the forehearth. If the stirrers are in good condition, they may be returned to service by swinging the arm 8 and attached stirrers back to their full line positions in Fig. 1 and then lowering them to the service positions indicated by the dot-and-dash lines. If replacement thereof is required, this may be readily accomplished while the arm 8 is in its laterally swung elevated position. It of course will be understood that the driving unit may be stopped for replacement of stirrers and also if desired after the arm 8 has been elevated and while it is being swung back and forth in its elevated position. The driving unit will of course have conventional or other suitable control means by which it can be started and stopped at will.

The same shaft that is used to turn the jack screw 29 may also transmit power to the stirrer spindles to rotate them about their individual axes. As shown in Fig. 6, the shaft 38 carries a worm 76 in mesh with a worm wheel 77 on a vertical shaft 78 which is journaled at its lower end in a thrust bearing 79 in the bottom of the box 24 and extends upwardly from the box 24 through an antifriction bearing 80 in a suitable aperture 81 in the top of the box 24. Above the box 24, the shaft 78 is connected by an overload release clutch 82 with an aligned vertical shaft 78a which may be retained in proximity to the tubular column 12 by suitable retaining means. Such a means may comprise an apertured bracket arm 83 on the tubular boss 22. A bracket arm 84 projecting laterally and upwardly from the collar 14 by which the arm 8 is mounted on the tubular supporting post may be formed with vertically spaced branches 84a and 84b between which a driving sprocket 85 is rotatably disposed. The driving sprocket has a bore 86 aligned with vertical openings 87 and 88 in the vertically spaced branches 84a and 84b, respectively, of the bracket arm 84 and the shaft 78a extends slidably through these aligned openings 88, 86 and 87 as shown in Fig. 7. The sprocket 85 is shown as being provided with a vertical spline 89 projecting from the wall of its bore into a vertical splineway 90 in the shaft 78a so that the sprocket will be rotated by the shaft while being mounted for vertical sliding movement thereon. A chain 91 is trained about the sprocket 85 and around sprockets 92 individual to the spindles 5 and also about a guiding and chain tightening idle sprocket 93 on an idle sprocket arm 94 mounted on the upper end of the split collar hub 14. See Fig. 1. The arrangement just described assures driving of the stirrers about their respective axes when the stirrers are in their service positions, as shown by dot-and-dash lines in Fig. 1, and permits the stirrers to be elevated and swung laterally when elevated without disturbance of the driving connection between the shaft 38 and the stirrer spindles.

Stop means may be provided to limit the swinging movement of the arm 8 from its outwardly swung, raised position to its elevated position over the forehearth so that the stirrers will be located in the forehearth as desired when the arm 8 has been lowered and also to assure alignment of the latching bolt 68 on the arm 8 with the aperture 69 in the fixed position latching arm 70. As shown best in Figs. 2 and 3, an upstanding projection 95 on a bracket 96 attached to the rotary boss 22 on the top of the box 24 is adapted to strike an adjustable stop 97 in a fixed position arm 98 of a bracket 99 attached to the stationary column supporting tube 17 when the column and arm 8 have been swung as a unit from the dotted position to the full line position of Fig. 1.

The number of stirrers rotatably supported from the overhanging arm on the vertically movable upper section of the angularly turnable supporting column may vary according to particular widths of forehearth channels or different preferences or requirements. Whether one, two or more stirrers are included in such an assembly, supporting and operating means therefor as provided by the present invention may be substantially as herein described and will provide advantages such as have been mentioned.

Many other changes in and modifications of the illustrative embodiment of the invention shown in the accompanying drawings and described in detail herein will now be apparent to the skilled workers in the art and I therefore do not wish to be limited to the details of such embodiment.

I claim:

1. A stirring apparatus for molten glass in a forehearth comprising a stationary vertical tubular support fixed to one side of the forehearth, a tubular column extending through and rotatably supported in said stationary tubular support, said tubular column including a vertically movable portion extending above the level of the forehearth, a substantially horizontal supporting arm projecting from said vertically movable portion of the column above and in overhanging relation to the forehearth, a jack screw rotatably mounted in said column, a nut secured to said vertically movable portion of the column and threadedly engaged with said jack screw, driving means carried by said column for operating the jack screw selectively in either of opposite directions to raise or lower said arm, a vertical spindle rotatably mounted on said arm in a position above the forehearth, a vertical stirrer operatively connected to said spindle to depend into the forehearth to an operative position therein when said arm is in a relatively lowered position above the forehearth, and driving means mounted to move with said column when the latter is turned angularly about its axis and operatively connected with said spindle to rotate said spindle and the stirrer connected therewith.

2. A stirring apparatus, as defined by claim 1, wherein said means for operating said jack screw comprises a gear and clutch box mounted on the lower end of the angularly turnable column, a driven shaft in said box, a bevel gear fast to the jack screw and located within said box adjacent to said shaft, a pair of opposed bevel gears loosely mounted on said shaft and both engaged with the bevel gear on the jack screw, and a double throw clutch on said shaft for selectively connecting either of said opposed bevel gears with said driven shaft, and a prime mover also supported to turn with said column and operatively connected with said driven shaft.

3. A stirring apparatus, as defined by claim 2, wherein the means for rotating said spindle comprises a vertical shaft journaled in said clutch and gear box, means in said box for driving said vertical shaft from said driven shaft therein, a vertical shaft above the gear box extending adjacent to said column, an overload release clutch operatively connecting said vertical shaft in said box with the second-named vertical shaft, a sprocket splined to said second-named vertical shaft and supported for movement with said supporting arm, and motion transmitting means operatively connecting said sprocket with said spindle.

4. Stirring apparatus for molten glass in a forehearth comprising an upright tubular column located at one side of said forehearth and adjacent thereto and projecting above the level of the forehearth, said column comprising a tubular lower portion mounted at a fixed level in relation to the forehearth so as to be angularly turnable about its vertical axis and a tubular upper portion mounted on the lower portion to slide vertically relative thereto and to turn angularly about its vertical axis with the lower portion, a substantially horizontal arm secured firmly at one end to said vertically movable and angularly turnable upper portion of said column in position to overhang the forehearth when said upper portion of the column is in one angularly turned position about its vertical axis, a rotatable vertical stirring implement depending from said arm to an operative position in said forehearth when said arm is disposed in overhanging relation to the forehearth and the upper portion of said column is in a relatively lowered position, means extending within said tubular column and having an operative engagement with the upper portion of said column to raise and lower it, and means operatively connected with said stirrer to rotate it when said stirrer is in its operative position in said forehearth, said means to raise and lower the upper portion of said column comprising a rotatable vertical jack screw within the column, a nut secured to the vertically movable portion of the column in screw threaded engagement with the jack screw, and means to rotate said jack screw in either of opposite directions about its axis.

5. A stirring apparatus for molten glass in a forehearth comprising a vertical supporting column comprising a tubular lower section rotatably supported at one side of the forehearth and adjacent thereto and a tubular upper section rotatable with the lower section and also movable vertically relative thereto, a rigid laterally projecting arm on said upper section of the column in position to overhang the forehearth when said column has been turned angularly about its axis to one position, a plurality of spaced vertical spindles rotatably mounted on said arm, vertical stirrers operatively connected to the spindles to depend therefrom into the forehearth when said arm is in said overhanging relation to the forehearth, means to move said upper section of said column vertically to position said stirrers in operative positions in the forehearth for service and to raise the stirrers completely out of the forehearth at will, and means to rotate said spindles to operate said stirrers, said means to move said upper section of said column vertically comprising a rotatable vertical jack screw extending through and journaled in said column, a nut fixed to the upper section of the column in threaded engagement with the jack screw, and operating means for the jack screw supported by the lower section of said column.

6. A stirring apparatus as defined by claim 5 wherein said jack screw operating means comprises a rotating shaft adjacent to the jack screw and motion transmitting means operatively disposed between the shaft and the jack screw and including a double throw clutch having an intermediate, neutral position.

7. A stirring apparatus as defined by claim 6 wherein said jack screw operating means includes automatic means to return said clutch to its intermediate, neutral position when said jack screw has been rotated in one direction to lower the upper section of said column to a predetermined level.

8. A stirring apparatus as defined by claim 7 wherein said automatic means comprises a laterally projecting rigid striker on the movable upper section of the column, a normally raised, spring loaded, vertically movable rod positioned beneath and in the path of the descending striker, and a clutch operating member projecting into the path of descent of said rod so as to be actuated thereby when the rod has been moved downward a predetermined distance by said striker.

WILLIAM P. SPIGENER.

REFERENCES CITED

The following references are of record in the file of this patent:

UNITED STATES PATENTS

| Number | Name | Date |
|---|---|---|
| 1,727,606 | Klausmeyer et al. | Sept. 10, 1929 |
| 2,217,182 | Peiler | Oct. 8, 1940 |
| 2,238,800 | Mueller | Apr. 15, 1941 |
| 2,254,046 | Pearson | Aug. 26, 1941 |
| 2,467,809 | Cannon et al. | Apr. 19, 1949 |

FOREIGN PATENTS

| Number | Country | Date |
|---|---|---|
| 102,916 | Great Britain | Jan. 4, 1917 |